United States Patent
Nakamura et al.

(12)

(10) Patent No.: US 6,608,144 B1
(45) Date of Patent: Aug. 19, 2003

(54) ETHYLENE α-OLEFIN/UNCONJUGATED POLYENE RANDOM COPOLYMER RUBBER CONTAINING HYDROLYZABLE SILYL GROUP AND PROCESS FOR PRODUCING THE SAME

(75) Inventors: Tsutomu Nakamura, Gunma-ken (JP); Takeo Yoshida, Gunma-ken (JP); Akira Yamamoto, Gunma-ken (JP); Takashi Hakuta, Ichihara (JP); Yoshiharu Kikuchi, Ichihara (JP); Masaaki Kawasaki, Ichihara (JP)

(73) Assignees: Shin-Etsu Chemical Co., Ltd.; Mitsi Chemicals, Inc., Tokyo (JP)

( * ) Notice: Subject to any disclaimer, the term of this patent is extended or adjusted under 35 U.S.C. 154(b) by 0 days.

(21) Appl. No.: 09/787,850

(22) PCT Filed: Jul. 19, 2000

(86) PCT No.: PCT/JP00/04841

§ 371 (c)(1),
(2), (4) Date: Mar. 23, 2001

(87) PCT Pub. No.: WO01/07490

PCT Pub. Date: Feb. 1, 2001

(30) Foreign Application Priority Data

Jul. 23, 1999 (JP) ............................................. 11-208942

(51) Int. Cl.[7] .................................................. C08F 8/00

(52) U.S. Cl. ...................................... 525/331.7; 525/342
(58) Field of Search ................................ 525/331.7, 342

(56) References Cited

U.S. PATENT DOCUMENTS

| 3,503,943 A | * | 3/1970 | Kresge et al. ........... 525/331.7 |
| 4,759,992 A | | 7/1988 | Tomko et al. |
| 4,767,814 A | | 8/1988 | Bae et al. |
| 4,818,789 A | | 4/1989 | Tomko et al. |

FOREIGN PATENT DOCUMENTS

| EP | 0 260 103 A1 | 3/1988 |
| JP | A63108015 | 5/1988 |
| JP | 63 238133 A | 10/1988 |
| JP | A4306202 | 10/1992 |
| JP | A5214079 | 8/1993 |
| JP | A940586 | 2/1997 |
| JP | A959317 | 3/1997 |
| WO | WO 01/07489 A1 | 2/2001 |

* cited by examiner

*Primary Examiner*—Bernard Lipman
(74) *Attorney, Agent, or Firm*—Birch Stewart Kolasch & Birch LLP

(57) ABSTRACT

The invention provides an ethylene-α-olefin-unconjugated polyene random copolymer rubber having hydrolyzable silyl groups in the molecule, which is crosslinkable with airborne moisture at room temperature and is not only useful for resin modification, but also applicable as elastic sealants and adhesives, and a method for preparing the same.

10 Claims, No Drawings

ETHYLENE α-OLEFIN/UNCONJUGATED POLYENE RANDOM COPOLYMER RUBBER CONTAINING HYDROLYZABLE SILYL GROUP AND PROCESS FOR PRODUCING THE SAME

This application is the national phase under 35 U.S.C. §371 of PCT International Application No. PCT/JP00/04841 which has an International filing date of Jul. 19, 2000 which designated the United States of America, the entire contents of which are hereby incorporated by reference.

TECHNICAL FIELD

This invention relates to a hydrolyzable silyl group-containing polyolefin in the form of an ethylene-α-olefin-unconjugated polyene random copolymer rubber having hydrolyzable silyl groups introduced therein, and a method for preparing the same.

BACKGROUND ART

Methods known in the art for obtaining hydrolyzable silicon-containing polyolefins include a method of reacting polyethylene with vinyltrimethoxysilane under polyethylene molding conditions in the presence of a peroxide, and a method of copolymerizing an olefin monomer with an alkenyl group-containing alkoxysilane.

However, the hydrolyzable silicon-containing polyolefins obtained by these methods are solid at room temperature and can be used for resin modification purposes, but cannot be applied as sealants and adhesives.

The applicant proposed (in JP-A 9-59317) a method of obtaining a liquid hydrolyzable silicon-containing polyolefin by reacting a polybutadiene oligomer with a silicon compound. This polymer results in an elastomer, which has an insufficient strength. It is desired to have a practically acceptable hydrolyzable silicon-containing polyolefin having hydrolyzable silyl groups introduced therein.

DISCLOSURE OF THE INVENTION

The present invention has been made under the above-described circumstances, and its object is to provide a hydrolyzable silyl group-containing ethylene-α-olefin-unconjugated polyene random copolymer rubber (EPDM) which can be crosslinked with air-borne moisture at room temperature, and a method for preparing the same.

Making extensive investigations to attain the above objects, the inventor has found that when a specific ethylene-α-olefin-unconjugated polyene random copolymer rubber, that is, an ethylene-α-olefin-unconjugated polyene random copolymer rubber in which the unconjugated polyene is at least one terminal vinyl group-containing norbornene compound of the general formula (I) or (II) shown below is subjected to hydrosilylation reaction with a silicon compound of the general formula (2) shown below, thereby adding the SiH group to a double bond in the copolymer, there is obtained a hydrolyzable silyl group-containing polyolefin (ethylene-α-olefin-unconjugated polyene random copolymer rubber) which can be crosslinked with air-borne moisture at room temperature, and that this hydrolyzable silyl group-containing polyolefin is applicable as one-part RTV without further treatment and useful as elastic sealants and adhesives, and also applicable for resin modification of the crosslinking type by admixing with polyolefins or other resins.

More particularly, ethylidene norbornene, dicyclopentadiene, 1,4-hexadiene, etc. are known in the prior art as the diene moiety in ethylene-α-olefin-unconjugated polyene random copolymer rubbers, and the ethylene-α-olefin-unconjugated polyene random copolymer rubbers having these diene moieties do not undergo hydrosilylation reaction with a silicon compound of the general formula (2). Quite unexpectedly, the inventors have found that the hydrosilylation reaction readily takes place when the unconjugated polyene is at least one terminal vinyl group-containing norbornene compound of the general formula (I) or (II), resulting in a hydrolyzable silyl group-containing polyolefin having improved physical properties as mentioned above. The present invention is predicated on these findings.

Accordingly, the invention provides an ethylene-α-olefin-unconjugated polyene random copolymer rubber containing in a molecule hydrolyzable silyl groups represented by the following general formula (1); and a method for preparing the ethylene-α-olefin-unconjugated polyene random copolymer rubber, characterized by subjecting an ethylene-α-olefin-unconjugated polyene random copolymer rubber in which the unconjugated polyene is at least one terminal vinyl group-containing norbornene compound of the following general formula (I) or (II) to hydrosilylation reaction with a silicon compound of the following general formula (2), thereby adding the SiH group of the silicon compound to a double bond in the copolymer.

Herein R is a monovalent hydrocarbon group of 1 to 12 carbon atoms, X is a hydrolyzable group selected from the group consisting of hydride, halogen, alkoxy, acyloxy, ketoxymate, amide, acid amide, and aminoxy groups, and the letter "a" is an integer of 0, 1 or 2.

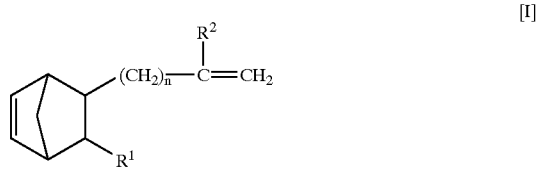

Herein n is an integer of 0 to 10, $R^1$ is hydrogen or an alkyl group of 1 to 10 carbon atoms, and $R^2$ is hydrogen or an alkyl group of 1 to 5 carbon atoms.

Herein $R^3$ is hydrogen or an alkyl group of 1 to 10 carbon atoms.

BEST MODE FOR CARRYING OUT THE INVENTION

The invention is described in detail below. The hydrolyzable silyl group-containing ethylene-α-olefin-unconjugated polyene random copolymer rubber according to the first embodiment of the invention is an ethylene-α-olefin-unconjugated polyene random copolymer rubber in which the unconjugated polyene is at least one terminal vinyl group-containing norbornene compound of the following general formula (I) or (II) and which contains hydrolyzable silyl groups represented by the formula (1) on side chains or at ends thereof. The hydrolyzable silyl group has a hydrolyzable group attached to a silicon atom. Examples of the hydrolyzable group include hydride, halogen, alkoxy, acyloxy, ketoxymate, amide, acid amide, and aminoxy groups. Of these, the alkoxy, acyloxy, and ketoxymate groups are preferred, with the alkoxy groups being especially preferred.

The method for preparing the hydrolyzable silyl group-containing ethylene-α-olefin-unconjugated polyene random copolymer rubber according to the invention is not critical, although the preferred method is by subjecting an ethylene-α-olefin-unconjugated polyene random copolymer rubber in which the unconjugated polyene is at least one terminal vinyl group-containing norbornene compound of the following general formula (I) or (II) to hydrosilylation reaction with a silicon compound of the following general formula (2).

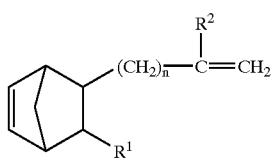
[I]

Herein n is an integer of 0 to 10, $R^1$ is hydrogen or an alkyl group of 1 to 10 carbon atoms, and $R^2$ is hydrogen or an alkyl group of 1 to 5 carbon atoms.

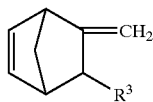
[II]

Herein $R^3$ is hydrogen or an alkyl group of 1 to 10 carbon atoms.

(2)

Herein R is a monovalent hydrocarbon group of 1 to 12 carbon atoms, X is a hydrolyzable group selected from the group consisting of hydride, halogen, alkoxy, acyloxy, ketoxymate, amide, acid amide, and aminoxy groups, and the letter "a" is an integer of 0, 1 or 2.

The ethylene-α-olefin-unconjugated polyene random copolymer rubber used herein as a first component is desirably one whose diene moiety is at least one terminal vinyl group-containing norbornene compound of the general formula (I) or (II). Among others, 5-vinyl-2-norbornene and 5-methylene-2-norbornene are preferred. Such a copolymer is prepared, for example, by randomly copolymerizing ethylene and propylene with an appropriate amount of 5-vinyl-2-norbornene in a hydrocarbon solvent in the presence of a catalyst containing a vanadium base catalyst and an organic aluminum base catalyst as main components. The vanadium base catalyst used herein includes $VOCl_3$, $VO(OC_2H_5)_3$, etc. and the organic aluminum base catalyst includes triethylaluminum, diethylaluminum ethoxide, etc. It is desired to use at least one vanadium base catalyst and at least one organic aluminum base catalyst in combination. As the catalyst used in the copolymerization, it is acceptable to use so-called metallocene catalysts, for example, the metallocene catalysts described in JP-A 9-40586. The preferred conditions for this copolymerization reaction include a polymerization temperature of 30 to 60° C., more desirably 30 to 50° C., and a polymerization pressure of 4 to 12 kgf/cm², more preferably 5 to 8 kgf/cm², while the unconjugated polyene and the α-olefin are preferably fed in such amounts as to give a molar ratio (unconjugated polyene/α-olefin) of from 0.01 to 0.2.

In the practice of the invention, the ethylene-α-olefin-unconjugated polyene random copolymer rubber should preferably have a Mooney viscosity $ML_{1+4}$ at 100° C. of up to 80, and especially up to 60. Especially for elastic sealant and adhesive applications, the copolymer rubber should preferably have fluidity at room temperature (25°C.). The copolymer rubber should preferably have an iodine value of 1 to 30, and especially 2 to 20. The ethylene content is preferably 40 to 95 mol %, and especially 50 to 70 mol %.

Illustrative examples of the ethylene-α-olefin-unconjugated polyene random copolymer rubber which can be used herein include one having a $ML_{1+4}$ (100°C.) of 38, an ethylene content of 68 mol % and an iodine value of 4, one having a $ML_{1+4}$ (100° C.) of 55, an ethylene content of 68 mol % and an iodine value of 10, and one having a $ML_{1+4}$ (100° C.) of 9, an ethylene content of 63 mol % and an iodine value of 15.

In the practice of the invention, partially hydrogenated products of the ethylene-α-olefin-unconjugated polyene random copolymer rubber are also advantageously used. Partial hydrogenation can be conducted by a conventional catalytic hydrogen reduction method using a Pd, Pt or Ni base catalyst.

The second embodiment of the invention is a method for preparing a hydrolyzable silyl group-containing polyolefin by subjecting an ethylene-α-olefin-unconjugated polyene random copolymer rubber in which the unconjugated polyene is at least one terminal vinyl group-containing norbornene compound of the following general formula (I) or (II) to hydrosilylation reaction with a hydrolyzable group-containing silicon compound of the following general formula (2).

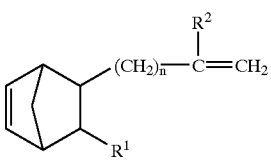
[I]

Herein n is an integer of 0 to 10, $R^1$ is hydrogen or an alkyl group of 1 to 10 carbon atoms, and $R^2$ is hydrogen or an alkyl group of 1 to 5 carbon atoms.

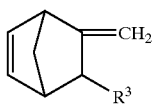

[II]

Herein R³ is hydrogen or an alkyl group of 1 to 10 carbon atoms.

(2)

Herein R stands for substituted or unsubstituted monovalent hydrocarbon groups of 1 to 12 carbon atoms, preferably free of aliphatic unsaturation, for example, alkyl groups such as methyl, ethyl, propyl, butyl, hexyl and cyclohexyl, aryl groups such as phenyl and tolyl, and substituted ones of these groups in which some or all of the hydrogen atoms attached to carbon atoms are replaced by halogen atoms such as fluorine atoms or the like. X is a group selected from among hydride, halogen, alkoxy, acyloxy, ketoxymate, amide, acid amide, and aminoxy groups. Preferred among others are alkoxy groups, especially alkoxy groups of 1 to 4 carbon atoms. It is noted that the letter "a" is an integer of 0, 1 or 2, preferably 0 or 1.

Illustrative examples of the silicon compound of the general formula (2) include halogenated silanes such as trichlorosilane, methyldichlorosilane and dimethylchlorosilane; alkoxysilanes such as trimethoxysilane, triethoxysilane, methyldimethoxysilane, methyldiethoxysilane, phenyldimethoxysilane, and bis(methyl ethyl ketoxymate)methylsilane; acyloxysilanes such as triacetoxysilane and methyldiacetoxysilane; and ketoxymate silanes such as tris(acetoxymate)silane, bis(dimethyl-ketoxymate)methylsilane and bis(cyclohexylketoxymate)-methylsilane. Of these, alkoxysilanes are especially desirable.

The silicon compound of formula (2) is preferably used in an amount of 0.01 to 5 mol, more preferably 0.05 to 3 mol, per double bond in the ethylene-α-olefin-unconjugated polyene random copolymer rubber.

Hydrosilylation reaction is effected using a catalyst in the form of a transition metal complex. The useful catalysts used herein are Group VIII transition metal complexes selected from among platinum, rhodium, cobalt, palladium and nickel, for example. Of these, platinum base catalysts such as chloroplatinic acid and platinum olefin complexes are preferred. The amount of the catalyst used herein is a catalytic amount, preferably 1 to 1,000 ppm, especially 20 to 200 ppm of metal unit based on the reactants. An appropriate temperature for the hydrosilylation reaction is 30 to 180° C., preferably 60 to 150° C. Reaction may be effected under pressure if necessary.

The solvent may be used or not. If the solvent is used, inert solvents such as ethers and hydrocarbons are preferred.

According to the invention, the hydrosilylation reaction results in a hydrolyzable silyl group-containing compound in which the SiH group of the silicon compound is added to a double bond in the ethylene-α-olefin-unconjugated polyene random copolymer rubber as shown below.

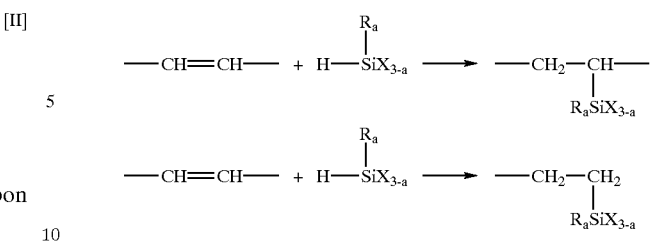

It is possible to add a one end hydrogen-modified siloxane represented by the following formula along with the hydrolyzable silyl group compound of formula (2), thereby imparting weather resistance, slip properties and gas permeability characteristic of the siloxane.

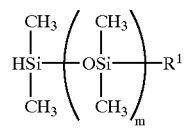

Herein R¹ is a substituted or unsubstituted, monovalent hydrocarbon group of 1 to 12 carbon atoms, especially an alkyl group, and m is an integer of 5 to 200, especially 10 to 150.

According to the invention, there is obtained a hydrolyzable silyl group-containing polyolefin which is crosslinkable with air-borne moisture at room temperature and which is not only useful for resin modification, but also applicable as elastic sealants and adhesives.

Examples of the invention are given below by way of illustration and not by way of limitation.

EXAMPLE 1

To 50 g of an ethylene-propylene-(5-vinyl-2-norbornene) copolymer (by Mitsui Chemical Co., Ltd., Mooney viscosity $ML_{1+4}$ (100° C.) 9, ethylene content 63 mol %, iodine value 15) was added 0.2 cc of a 2% toluene solution of chloroplatinic acid. To this, 15 g of methyldimethoxysilane was admitted, and reaction was effected at 120° C. for 2 hours. At the end of reaction, the excess of methyldimethoxysilane and the solvent were distilled off, yielding 60 g of a dimethoxysilyl group-modified polyolefin (EPDM).

A 10 g portion of the dimethoxysilyl group-modified polyolefin (EPDM) was weighed, admixed with 0.05 g of dibutyltin dioctoate, and poured into a glass dish with a diameter of 2 cm and a depth of 1.5 cm where it was allowed to stand at room temperature for curing with air-borne moisture. After 4 days, there was obtained an elastic, tough elastomer. The elastomer was measured for strength according to JIS K6249, finding a strength of 5 MPa.

COMPARATIVE EXAMPLE 1

In 54 g of n-hexane was dissolved 54 g of a liquid polybutadiene (n=55) (Nippon Soda Co., Ltd., NISSO-PB B-3000). The solution, together with 2 g of 5% Pd on carbon, was placed in an autoclave of 300 ml. While keeping at 25° C. and under a hydrogen pressure of 5 kg/cm², 1.9 g of hydrogen was reacted with the polybutadiene. At the end of reaction, the hydrogen was purged with nitrogen before the autoclave was opened. The Pd on carbon was filtered off. From the filtrate, the degree of unsaturation of the oligomer was measured, finding that on the average, 2.5 double bonds per molecule were left.

Next, the filtrate was placed in an autoclave again, 0.2 cc of a 2% toluene solution of chloroplatinic acid added, and 15 g of methyldimethoxysilane admitted. Reaction was effected at 120° C. for 2 hours. At the end of reaction, the excess of methyldimethoxysilane and the solvent were distilled off, yielding 60 g of a dimethoxysilyl group-modified polyolefin.

A 10 g portion of the dimethoxysilyl group-modified polyolefin was weighed, admixed with 0.05 g of dibutyltin dioctoate, and poured into a glass dish with a diameter of 2 cm and a depth of 1.5 cm where it was allowed to stand at room temperature for curing with air-borne moisture. After 4 days, there was obtained an elastic, tough elastomer. The elastomer was measured for strength as in Example 1, finding a strength of 1 MPa.

What is claimed is:

1. An ethylene-α-olefin-unconjugated polyene random copolymer rubber characterized by containing in a molecule hydrolyzable silyl groups represented by the following general formula (1):

(1)

wherein R is a monovalent hydrocarbon group of 1 to 12 carbon atoms, X is a hydrolyzable group selected from the group consisting of hydride, halogen, alkoxy, acyloxy, ketoxymate, amide, acid amide, and aminoxy groups, and the letter "a" is an integer of 0, 1 or 2, and obtained by subjecting an ethylene-α-olefin-unconjugated polyene random copolymer rubber to hydrosilylation reaction in the presence of a catalyst in the form of a transition metal complex with a silicon compound of the following general formula (2):

$$H\text{—}SiR_aX_{3-a} \quad (2)$$

wherein R, X and Letter "a" are as defined above, thereby adding the SiH group of said silicon compound to a double bond in said copolymer.

2. The copolymer rubber of claim 1 having fluidity at room temperature.

3. A method for preparing the ethylene-α-olefin-unconjugated polyene random copolymer rubber of claim 1 or 2, characterized by subjecting an ethylene-α-olefin-unconjugated unconjugated polyene random copolymer rubber in which the unconjugated polyene is at least one terminal vinyl group-containing norbornene compound of the following general formula (I) or (II):

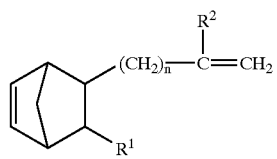
[I]

wherein n is an integer of 0 to 10, $R^1$ is hydrogen or an alkyl group of 1 to 10 carbon atoms, and $R^2$ is hydrogen or an alkyl group of 1 to 5 carbon atoms,

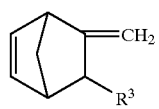
[II]

wherein $R^3$ is hydrogen or an alkyl group of 1 to 10 carbon atoms, to hydrosilylation reaction with a silicon compound of the following general formula (2):

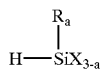
(2)

wherein R is a monovalent hydrocarbon group of 1 to 12 carbon atoms, X is a hydrolyzable group selected from the group consisting of hydride, halogen, alkoxy, acyloxy, ketoxymate, amide, acid amide, and aminoxy groups, and the letter "a" is an integer of 0, 1 or 2, thereby adding the SiH group of said silicon compound to a double bond in said copolymer.

4. The copolymer rubber of claim 1 wherein the unconjugated polyene of the ethylene-α-olefin-unconjugated polyene random copolymer rubber is at least one terminal vinyl group-containing norbornene compound of the following general formula (I) or (II):

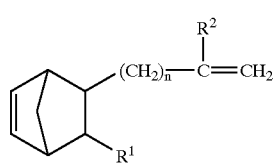
(I)

wherein n is an integer of 0 to 10, $R^1$ is hydrogen or an alkyl group of 1 to 10 carbon atoms, and $R^2$ is hydrogen or an alkyl group of 1 to 5 carbon atoms,

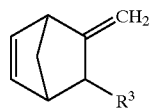
(II)

wherein $R^3$ is hydrogen or an alkyl group of 1 to 10 carbon atoms.

5. The copolymer rubber of claim 4 having fluidity at room temperature.

6. The method of claim 3 wherein the hydrosilylation reaction is conducted in the presence of a catalyst in the form of a transition metal complex.

7. The method of claim 3 wherein the unconjugated polyene is 5-vinyl-2-norbornene.

8. The copolymer rubber of claim 4 wherein the unconjugated polyene is 5-vinyl-2-norbornene.

9. The ethylene-α-olefin-unconjugated polyene random copolymer rubber of claim 1 wherein the silicon compound of the following general formula (2):

$$H\text{—}SiR_aX_{3-a} \quad (2)$$

is present in an amount of 0.01 to 5 moles.

10. The ethylene-α-olefin-unconjugated polyene random copolymer rubber of claim 1 wherein the silicon compound of the following general formula (2):

$$H\text{-}SiR_aX_{3-a} \quad (2)$$

is present in an amount of 0.05 to 3 moles.

* * * * *